United States Patent [19]

Bell et al.

[11] 3,923,548

[45] Dec. 2, 1975

[54] ELASTIC GAS VALVE FOR GALVANIC CELLS

[75] Inventors: Glaister Steward Bell; Jakob Bauer, both of Ellwangen, Germany

[73] Assignee: Varta Batterie Aktiengesellschaft, Hannover, Germany

[22] Filed: May 18, 1973

[21] Appl. No.: 361,462

[30] Foreign Application Priority Data

May 24, 1972  Germany.......................... 2225140

[52] U.S. Cl. ................ 133/133; 136/168; 136/178
[51] Int. Cl.² ......................................... H01M 2/12
[58] Field of Search ............ 136/133, 177, 178, 168

[56] References Cited
UNITED STATES PATENTS

| | | | |
|---|---|---|---|
| 819,159 | 5/1906 | Newbold | 136/168 X |
| 1,650,319 | 11/1927 | Briggs | 136/133 |
| 2,002,099 | 5/1935 | Schilke | 136/177 |
| 2,240,314 | 4/1941 | Reppert et al. | 136/178 |
| 2,766,316 | 10/1956 | Stevens, Jr. et al. | 136/133 |
| 3,497,395 | 2/1970 | Kohen | 136/178 |
| 3,503,811 | 3/1970 | Urry | 136/178 |
| 3,556,863 | 1/1971 | Nathe | 136/178 |
| 3,579,387 | 5/1971 | Voyentzie et al. | 136/178 X |
| 3,661,650 | 5/1972 | Flynn | 136/178 X |
| 3,671,325 | 6/1972 | Mocas | 136/178 |

FOREIGN PATENTS OR APPLICATIONS

| | | | |
|---|---|---|---|
| 379,232 | 10/1907 | France | 136/178 |
| 275,977 | 11/1913 | Germany | 136/133 |

*Primary Examiner*—Allen B. Curtis
*Assistant Examiner*—Thomas A. Waltz
*Attorney, Agent, or Firm*—Herbert L. Lerner

[57] ABSTRACT

A gas valve, in a galvanic cell having a cover and a current conductor extending through the cover, includes a sealing disc located at the cell cover and surrounding the current conductor, the sealing disc having an inner rim gas-tightly engaging the current conductor, at least one part of the inner rim engaging a smooth surface portion of the current conductor and being elastically yieldable under the action of an increased gas pressure within the cell so as to vent the gas.

9 Claims, 6 Drawing Figures

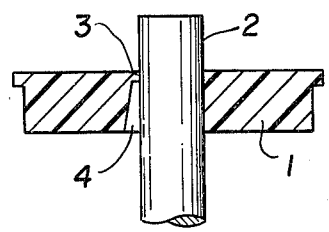
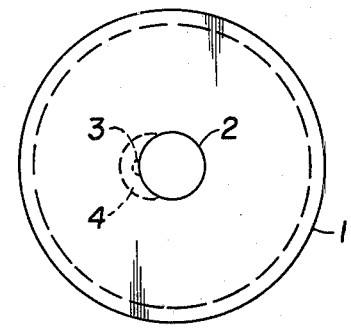
FIG.1a  FIG.1b
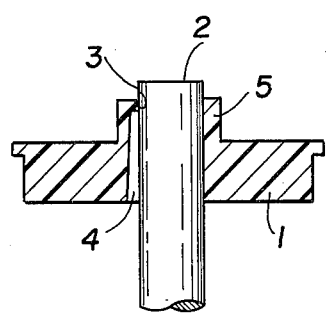
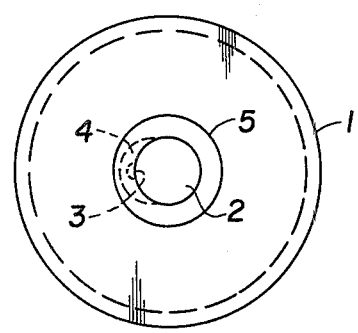
FIG.2a  FIG.2b
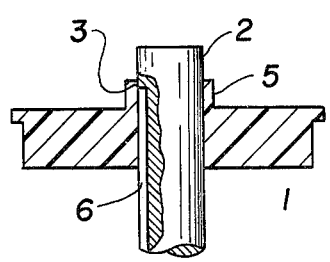
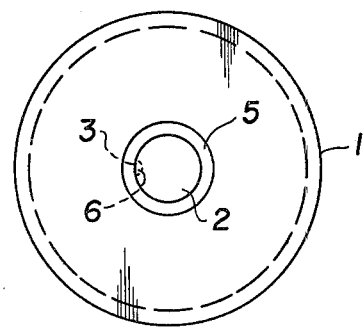
FIG.3a  FIG.3b

ELASTIC GAS VALVE FOR GALVANIC CELLS

The invention relates to a gas valve for galvanic cells, especially primary cells, and more particularly to such a gas valve that functions through the use of elastic materials and that is provided with a carbon rod which serves as a current conductor.

In primary cells that are capable of storage for long periods of time, a tight cell closure is required in order to prevent drying.

In various primary cells, gases are developed, for example, in very great quantities in magnesium-manganese dioxide cells with aqueous electrolyte. The gas development in these magnesium-manganese cells results from the reaction of magnesium with the aqeous electrolyte with the formation of magnesium hydroxide and hydrogen. As personal tests have shown, the "parasitic" hydrogen is about 200 ml per ampere hour for discharge current intensities that are more than 2 mA/cm$^2$. For smaller current densities, the electrochemically useless quantity of hydrogen per ampere hour that was developed is even greater. Even without any external load, hydrogen in small quantity is developed.

The construction of the valves proposed heretofore for gaseous primary cells is based on providing an opening in the closure cover of the cell, over which a loosely clamped thin foil is disposed. German published prosecuted application No. 1,596,290 describes a closure valve, formed of a porous body, that is closed by a liquid having a high boiling point. The construction of other heretofore known embodiments is based primarily on the fact that, due to the gas pressure which develops, the inner seal of the cover of the cell is forced so far out that the gas can flow past and can then escape from the cell container. If necessary, members having filter surfaces have been built into the cells for the specific purpose of collecting electrolyte droplets. Also, the heretofore known cells have been provided with a construction providing for one or more reversals of the path of flow of the gas within the cell vessel. However, such measures have been found to be either too costly or too unreliable.

It is accordingly an object of the invention to provide a gas valve in a galvanic cell that is reliably suited for mass production, which protects the cell against drying out, but which nevertheless opens after a given excessive pressure is attained and permits the gas to escape.

With the foregoing and other objects in view, there is provided, in accordance with the invention, at the bordering surfaces of the sealing disc and the current conductor of a galvanic cell, a weak region formed of elastic material which yields and thereby opens the valve when subjected to a given pressure. The sealing disc or at least a portion thereof at a radially inner region thereof must therefore be formed of a material having elastic properties and which maintains these properties together with a stability of form or shape over a wide temperature range substantially from −40°C to +80°C. A suitable material for this purpose has been found to be a polyolefine, for example, having a rigidity and hardness of a polyolefine of medium to high density and having a tensile strength and elongation or stretchability close to that of polypropylene.

Other features which are considered as characteristic for the invention are set forth in the appended claims.

Although the invention is illustrated and described herein as embodied in elastic gas valve for galvanic cells, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings, in which:

FIGS. 1a, 2a and 3a are longitudinal sectional views and

FIGS. 1b, 2a and 3a are respective top plan views of three embodiments of the gas valve constructed in accordance with the invention.

In each of the Figures, like parts are identified by the same reference numerals.

In all of the illustrated embodiments, the sealing disc, whose inner opening fits stiffly on the current conductor, is always pressed onto the latter so that the upper end of the latter extends freely therefrom. Significantly, the current conductor, which is preferably a carbon rod, has a surface which is as smooth as possible, so that a virtually gas-tight seat is attained. The sealing disc or ring must tightly close the negative electrode vessel which is illustrated in the Figures as a round cup. To provide this sealing action, any and all conventional and successful methods employed in practice are usable.

The gas valve of FIGS. 1a, 1b, is formed of a sealing disc 1 with a thinned-out or weakened portion 3 having a wall thickness usually of from 0.05 to 1.0 mm, preferably 0.1 to 0.6 mm, and a length of engagement with the current conductor 2 of from 0.1 to 10 mm, preferably 0.5 to 2.0 mm, depending upon the material of the sealing ring or disc 1. A tapering or conical groove 4 is formed at the inner peripheral surface of the sealing ring 1 and permits the weakened gas valve portion 3 to be raised under the action of gas pressure within the groove 4.

Through the sealing ring 1 having an extension in the form of a collar 5 according to the embodiment of FIGS. 2a and 2b, the weakened valve portion 3 is more accurately adjustable for smaller excess pressures because the collar 5 is somewhat yieldable elastically outwardly. For this reason, the thickness of the tonguelike weakened portion 3 can be greater than in the embodiment of FIGS. 1a and 1b, and can be as thick as 2 mm but preferably about 0.5 mm.

In the gas valve of FIGS. 3a and 3b, the path of the escaping gas does not go through the sealing ring 1 per se to the weakened or thinned valve portion 3, but rather through a longitudinal groove 6 formed on the surface of the current conductor 2. The thin-walled collar 5 formed, for example, by diecasting on the sealing disc 1, and which is dimensioned to correspond to the gas pressure to which it is expected to be subjected, is forced to a side by the pressure of the gas and, after the gas pressure has subsided, returns to its initial position by its inherent elasticity. Through the spacing between the end of the gas feed groove 6 formed in the current conductor-carbon rod 2 and the sealing valve portion 3 located thereabove, a pressure adjustment is also possible, in addition in fact also with respect to the thickness of the collar.

As illustrated in the drawings, the cover and gas valve, i.e. sealing ring 1 and valve portion 3, are fabricated as a single piece with the gas valve an integral part of the cover.

In practice, by means of this gas valve construction according to the invention and by suitable selection of the wall thickness and the surface of the weakened portion 3 which acts as an elastic tongue, adjustment to any desired gas pressure can be effected. The valve of this invention is suitable especially for mass production because of the simplicity of the manufacture thereof.

We claim:

1. In a galvanic cell having a cover and a current conductor extending through the cover, said cover including a gas valve, said cover and said gas valve being fabricated as a single piece with the gas valve an integral part of the cover comprising a sealing disc located at the cell cover and surrounding the current conductor with only a portion of the inner peripheral surface of said sealing disc surrounding said current conductor in contact with the surface of said conductor, said sealing disc having an inner rim gas-tightly in contact with a smooth vertical surface portion of the current conductor, said inner rim constituting only a portion of the inner peripheral surface of said sealing disc surrounding said current conductor, at least one part of said inner rim in contact with said smooth surface portion of the current conductor being elastically yieldable under the action of a given increased gas pressure within the cell so as to vent the gas.

2. A gas valve according to claim 1, wherein the current conductor is a carbon rod having said smooth surface portion in the sealing area.

3. A gas valve according to claim 1, wherein the galvanic cell is a magnesium-manganese dioxide primary cell.

4. A gas valve according to claim 1, wherein said sealing disc is in the form of an annulus and provided with a longitudinal groove in the inner peripheral surface open to the cell below and closed by said elastically yieldable part of the inner rim above.

5. A gas valve according to claim 4, wherein said sealing disc is formed additionally with a collar having an inner peripheral surface portion coextensive with said aforementioned inner peripheral surface and in contact with the current conductor, said groove being also formed in said inner peripheral surface portion of said collar and extending from the lower surface of the disc to the elastically yieldable part of the upper free surface of said collar.

6. A gas valve according to claim 1, wherein the current conductor has a terminal cap at one end thereof, and wherein the current conductor is a carbon rod formed with a longitudinal groove on the outer surface thereof said groove terminating in the region of the elastically yieldable part of the sealing disc.

7. A gas valve according to claim 6, wherein said sealing disc comprises a ring-shaped disc-like portion and a collar portion coaxially connected to said disc-like portion, said collar and disc-like portions having a coextensive inner peripheral surface in contact with said carbon rod, said groove terminating in the region covered by said collar.

8. A gas valve according to claim 1, wherein said sealing disc, at least at said one part of said inner rim thereof, is formed of a polyolefine.

9. A gas valve according to claim 8, wherein said polyolefine is polypropylene.

* * * * *